United States Patent
Humphrey et al.

(10) Patent No.: US 10,284,819 B2
(45) Date of Patent: May 7, 2019

(54) LONG-RANGE IMAGE RECONSTRUCTION USING MEASURED ATMOSPHERIC CHARACTERIZATION

(71) Applicant: Goodrich Corporation, Charlotte, NC (US)

(72) Inventors: Ian Peter Humphrey, Foxboro, MA (US); David Eric Berman Lees, Lexington, MA (US)

(73) Assignee: Goodrich Corporation, Charlotte, NC (US)

( * ) Notice: Subject to any disclaimer, the term of this patent is extended or adjusted under 35 U.S.C. 154(b) by 417 days.

(21) Appl. No.: 14/172,951

(22) Filed: Feb. 5, 2014

(65) Prior Publication Data

US 2015/0156463 A1   Jun. 4, 2015

Related U.S. Application Data

(60) Provisional application No. 61/910,585, filed on Dec. 2, 2013.

(51) Int. Cl.
| | |
|---|---|
| *H04N 7/18* | (2006.01) |
| *G01S 17/02* | (2006.01) |
| *G01S 17/95* | (2006.01) |
| *G06T 5/00* | (2006.01) |
| *G06K 9/00* | (2006.01) |
| *G02B 27/00* | (2006.01) |

(52) U.S. Cl.
CPC ........... *H04N 7/183* (2013.01); *G01S 17/023* (2013.01); *G01S 17/95* (2013.01); *G06K 9/0063* (2013.01); *G06T 5/00* (2013.01); *G06T 5/003* (2013.01); *G02B 27/0025* (2013.01); *G06T 2207/30181* (2013.01); *Y02A 90/19* (2018.01)

(58) Field of Classification Search
None
See application file for complete search history.

(56) References Cited

U.S. PATENT DOCUMENTS

| | | | |
|---|---|---|---|
| 6,229,595 B1 | 5/2001 | McKinley et al. | |
| 7,002,629 B2 | 2/2006 | Flynn | |
| 7,405,834 B1 | 7/2008 | Marron et al. | |
| 7,619,626 B2 | 11/2009 | Bernier | |
| 7,633,450 B2 | 12/2009 | Brittingham et al. | |
| 7,702,015 B2 | 4/2010 | Richter et al. | |
| 7,957,608 B2 | 6/2011 | Miller et al. | |

(Continued)

OTHER PUBLICATIONS

European Search Report for European Application No. 14194552.7 dated May 13, 2015.

*Primary Examiner* — Mikhail Itskovich
(74) *Attorney, Agent, or Firm* — Carlson, Gaskey & Olds, P.C.

(57) ABSTRACT

A method corrects a captured image and includes the steps of determining an effect of atmosphere and a distance from an image capture device which is spaced relatively far from an area of interest. The method utilizes a transmission and reception device to identify the effect on a transmitted and reflected signal due to the atmosphere and distance. An image of the area of interest is captured. The image is corrected based upon the effect of the distance and atmosphere on the transmitted and reflected signal. An apparatus programmed to perform the method is also disclosed. An apparatus for capturing an image from a distance is also disclosed.

16 Claims, 2 Drawing Sheets

(56) References Cited

U.S. PATENT DOCUMENTS

| | | |
|---|---|---|
| 8,174,444 B2 | 5/2012 | Parker |
| 8,392,507 B2 | 3/2013 | Ramos et al. |
| 8,406,513 B2 | 3/2013 | Chien |
| 8,488,845 B1 | 7/2013 | Tang et al. |
| 2003/0068095 A1 | 4/2003 | George |
| 2005/0151961 A1* | 7/2005 | McGraw .................. G01J 1/02 356/121 |
| 2005/0190448 A1 | 9/2005 | Barziza |
| 2012/0288212 A1 | 11/2012 | Arrasmith |
| 2013/0128257 A1* | 5/2013 | Stettner .................. G01S 17/06 356/4.01 |
| 2013/0222615 A1* | 8/2013 | Arrasmith ............... G06T 5/003 348/207.1 |

* cited by examiner

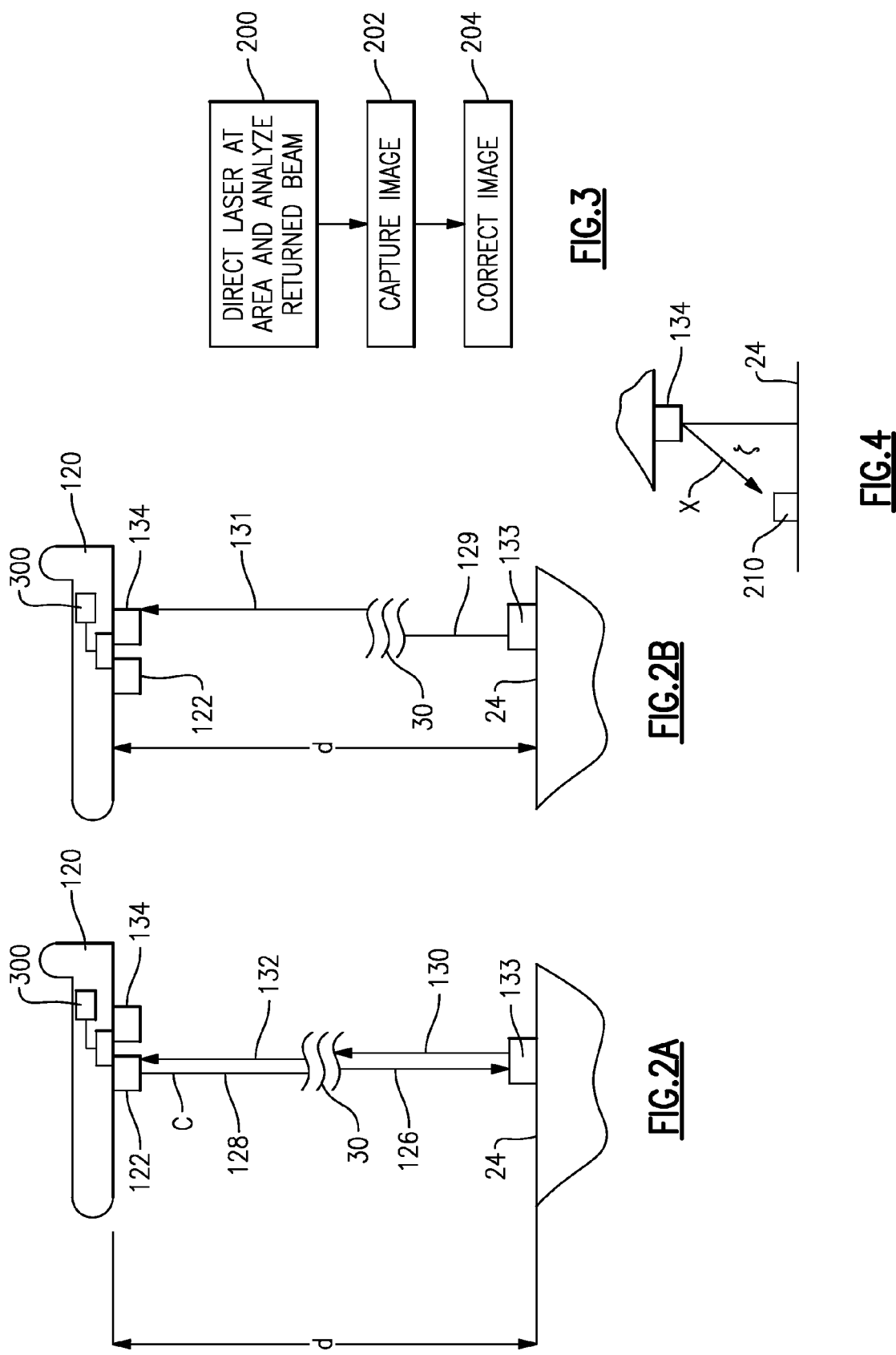

LONG-RANGE IMAGE RECONSTRUCTION USING MEASURED ATMOSPHERIC CHARACTERIZATION

RELATED APPLICATION

This application claims priority to U.S. Provisional Application No. 61/910,585, filed Dec. 2, 103.

BACKGROUND

This application relates to a method of improving images which have been captured over a very long range, and through the atmosphere.

Various image capture applications are known, and include capturing images of an area of interest from a very high altitude, such as from an airborne surveillance vehicle.

Long atmospheric path imaging is a challenge. As an example, one feature in an image may be captured through relatively calm air, whereas an adjacent feature may be through turbulent atmosphere. The turbulence can affect the quality of the image, and can lead to various modifications in the captured image that can challenge the reconstruction of the image.

The image can become diffuse, or a feature can simply be bent.

FIG. 1A shows an example wherein an aircraft 20 has an image capture device (a camera) 22 capturing images associated with the ground 24. The distance d from the ground 24 to the aircraft 20, is relatively great.

One point of interest 26 is associated with atmosphere having turbulence, shown schematically at 30. Another point of interest 28 may have no turbulence. Thus, the image 34 extending from the point of interest 28 is relatively undisturbed. On the other hand, the turbulence 30 can change the true image 31 of the area of interest 26 such that it is bent as shown schematically at 32.

Another area of interest 36 may have diffusion as shown at 38 by the time it passes through the distance d.

FIG. 1B shows one example of an image from an area of interest 36 which results in several repeated images 136 spaced about the actual center of the area of interest 36. This can result from turbulence, or simple diffusion of light as explained above with FIG. 1A.

FIG. 1C shows a light point 137 which is diffused to a large area 139. All of these raise challenges with regard to reconstructing an accurate image from an aircraft 20, or other application of capturing an image over a relatively great distance.

As also shown in FIG. 1A, the image capture device 22 may capture an image in a direction X which is not perpendicular to the ground 24. The direction X is shown to be spaced by an angle $\zeta$.

SUMMARY

A method corrects a captured image and includes the steps of determining an effect of atmosphere and a distance from an image capture device which is spaced relatively far from an area of interest. The method utilizes a transmission and reception device to identify the effect on a transmitted and reflected signal due to the atmosphere and distance. An image of the area of interest is captured. The image is corrected based upon the effect of the distance and atmosphere on the transmitted and reflected signal. An apparatus programmed to perform the method is also disclosed.

These and other features may be best understood from the following drawings and specification.

BRIEF DESCRIPTION OF THE DRAWINGS

FIG. 2A shows a first step in addressing the prior art concerns.
FIG. 2B shows a subsequent step.
FIG. 3 is a flowchart.
FIG. 4 shows another detail.

DETAILED DESCRIPTION

Figure 1A:
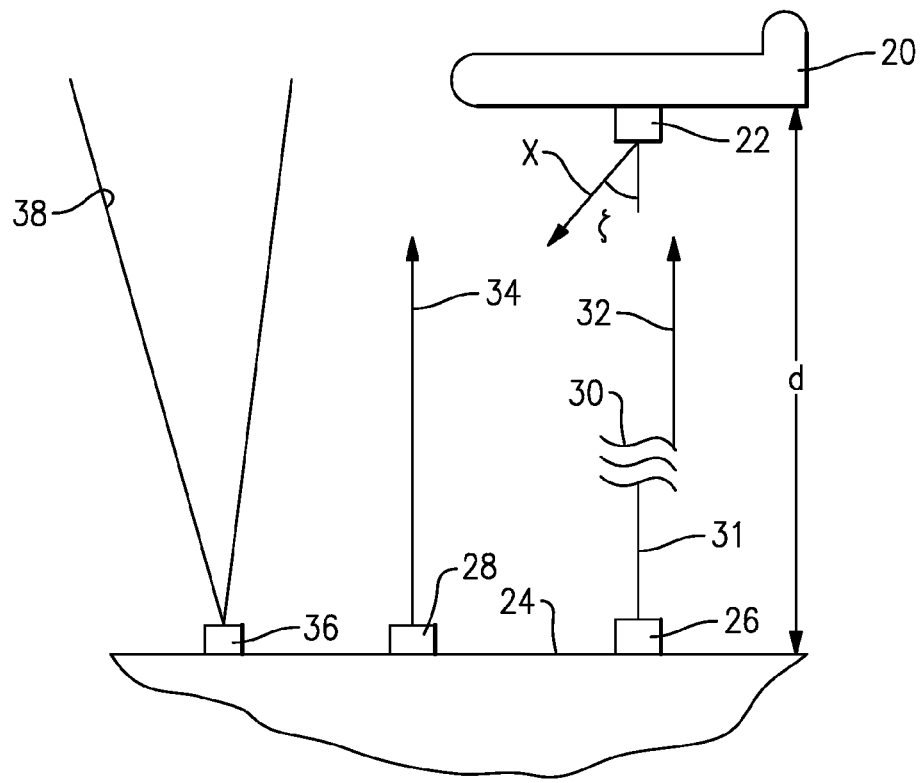
FIG. 1A schematically shows a prior art problem.
Figure 1B:
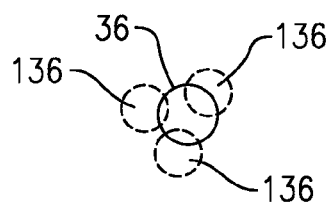
FIG. 1B shows one specie of the problem.
Figure 1C:
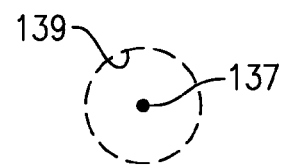
FIG. 1C shows another specie.

FIG. 2A shows an aircraft 120 carrying a ladar transmitter and receiver 122, and an image capture camera 134. The ground 24 includes an area of interest 133. The ladar transmitter and receiver 122 sends a signal 128 that passes through an area of turbulence 30. The signal 128 is bent as shown schematically at 126, and contacts the area of interest 133. A reflected ladar signal 130 passes back through the turbulence 30 and is bent as shown at 132 before it reaches the ladar transmission and reception system 122.

A computer or other controller 300 associated with the ladar transmission and reception system 122 can evaluate the effect of the turbulence 30, and the distance d between the aircraft 120 and the ground 24. Since the ladar signal passes through distance d twice (down, then back up), its effect will be doubled. The controller 300 is programmed to consider this multiplier.

Once the effect of the turbulence 30, or even simply the distance d, on the image is known, that effect can be utilized to correct the image captured by the image capture camera 134. Thus, as shown in FIG. 2B, the image capture camera 134 captures an image of the area of interest 133. That image may be modified by the turbulence 30 such that the original image 129 is bent as shown at 131. But, the effect of the turbulence 30 can be cancelled out due to a correction step developed through the use of the ladar as shown in FIG. 2A.

While a ladar system is disclosed, other ways of evaluating the effect of the atmospheric conditions on the distance can be substituted.

FIG. 3 is a flowchart showing the steps 200 of directing a laser at an area point and analyzing a returned beam to determine atmospheric state over each sub-image. At step 202, an image is captured. At step 204, that image is corrected based upon the analysis of step 200.

In fact, while the flowchart shows the step 200 occurring before the step 202, the reverse is possible. In addition, it may be that the two steps occur simultaneously, or effectively simultaneously. Since the atmospheric conditions can change in a relatively short period of time, the two steps should occur very close to each other temporally.

The above is an over-simplification of the overall system. In fact, the image captured by the camera 134 may be relatively large, and thus may include a plurality of smaller image portions.

As shown in FIG. 4, the image capture device 134 may be directed along a direction X at an area of interest 210. The direction X is spaced by an angle $\zeta$ defined by a direction perpendicular to the ground 24. This angle, along with several other variables, is utilized to refine the method as described above.

In particular, applicant recognized that the diameter of the lens for the image capture camera 134 may result in an image that includes portions which are affected to different degrees by turbulence. Thus, the correction, or step 200, may actually be performed over a plurality of patches, or sub-portions of the overall image. Such sub-portions can be called patches.

A Fried parameter $r_0$ is the diameter of a telescope (or image capture camera 134) which gives diffraction limited imaging in a turbulent atmosphere. High atmospheric turbulence means a small value for $r_0$. Since $r_0$ at sea level is on the order of 10 cm in the middle of the visible looking straight up, diffraction limited performance for most surveillance systems is not achieved. Further reduction in the Fried parameter is caused by increased atmospheric path. A standard approximation [1] is:

$$r'_0 = r_0 \left(\frac{\lambda}{0.5\ \mu m}\right)^{6/5} (\cos\zeta)^{3/5} \quad \text{Eqn. 1}$$

Where:
$\zeta$=Angle between zenith and observation direction
$\lambda$=Wavelength (microns)
$r_0$=Fried parameter at 0.5 microns looking straight up Table 1 is the result of computing the Fried parameter as a function of angle at SWIR wavelengths. While $r_0$ increases significantly at SWIR wavelengths compared with visible, the effect of long atmospheric paths far from zenith results in a value around 3 cm looking toward the horizon. This means a telescope with a 12 inch aperture has on the order of 80 isoplantic patches across its area.

TABLE 1

Fried parameter as a function of angle from zenith at $\lambda = 1.5\ \mu m$.

| Zeta(deg) | r0(cm) |
|---|---|
| 0 | 37.4 |
| 5 | 37.2 |
| 10 | 36.8 |
| 15 | 36.1 |
| 20 | 35.1 |
| 25 | 33.9 |
| 30 | 32.4 |
| 35 | 30.6 |
| 40 | 28.6 |
| 45 | 26.4 |
| 50 | 24 |
| 55 | 21.4 |
| 60 | 18.7 |
| 65 | 15.8 |
| 70 | 12.8 |
| 75 | 9.7 |
| 80 | 6.5 |
| 85 | 3.3 |

The approach proposed is to treat the camera aperture as a collection of small apertures, each with the area of an isoplanatic patch. An active measurement system will probe the atmosphere to estimate a Point Spread Function (PSF) over each patch. Thus, the ladar, or transmission and reception system 122, is directed at the ground over a plurality of patches within the image captured by the image capture camera 134. Then a deconvolution will be performed over the linear combination of PSFs.

Formally, the atmospherically distorted image formation is modeled as convolution of an array of point spread functions in Eqn 2 as:

$$s' = \sum_{i=0}^{N-1} \sum_{j=0}^{M-1} psf_{ij} * s \quad \text{Eqn. 2}$$

Where:
s=Undistorted image
s'=Image after atmospheric propogation
$psf_{ij}$=Point Spread Function Assuming a linear system this can be expressed as convolution:

$$s' = psf * s \quad \text{Eqn. 3}$$

Where the full point spread function is a spatial summation over the point spread functions for each patch:

$$psf = \sum_{i=0}^{N-1} \sum_{j=0}^{M-1} psf_{ij} \quad \text{Eqn. 4}$$

Conceptually, the image can be recovered by deconvolving the measured point spread functions.

$$s = FT^{-1}\{S/PSF\} \quad \text{Eqn. 5}$$

Where:

$$S = FT\{s\}$$

$$PSF = FT\{psf\}$$

The Fried parameter is utilized to determine the number of patches within the captured image from the image capture camera 134. It would be preferable that the ladar transmission and reception system 122 breaks its analysis of the area of interest 133 into as many patches as are determined by the Fried parameter.

Further, since any one of the ladar determined modifications (PSFs) of the signal based upon the atmosphere and distance may be corrupted, the use of a summed plurality of the corrections is beneficial in eliminating any one improper modification. The summed corrections may be summed over space (that is, over a plurality of adjacent patches), and may also be summed over time (that is, a plurality of repeated images).

That is, rather than assuming that each point spread function for each of the patches is accurate, applicant has recognized that summing the point spread functions, such that adjacent determined functions are all considered, will result in the elimination of any false data.

Although a method and system has been disclosed, a worker of ordinary skill in this art would recognize that certain modifications would come within the scope of this invention. For that reason, the following claims should be studied to determine the true scope and content.

The invention claimed is:
1. A method of correcting a captured image comprising the steps of:
   a) determining an effect of atmosphere and distance from an image capture device which is spaced relatively far from an area of interest by utilizing a transmission and reception device to identify the effect on a transmitted and reflected signal due to the atmosphere and distance;
   b) capturing an image of the area of interest;
   c) correcting the image based upon the effect of the distance and atmosphere on the transmitted and reflected signal;

(d) wherein the transmission and reception device breaks the area of the captured image into a plurality of patches, and said effect of the transmitted and reflected signal is analyzed separately for the plurality of patches, and utilized to correct the captured image; and (e) wherein the area of interest is on the ground, and an angle between the image capture device and the ground, and a direction perpendicular from an aircraft mounting the image capture device and the ground is utilized to determine a number of said patches.

2. The method as set forth in claim 1, wherein said transmitted and reflected signal is a ladar signal.

3. The method as set forth in claim 1, wherein said transmission and reception device and said image capture device are mounted on an aircraft.

4. The method as set forth in claim 1, wherein a wavelength of the particular wavelength being analyzed is also utilized to determine the number of said patches.

5. The method as set forth in claim 1, wherein a point spread function is determined as part of the effect of atmosphere and distance on the transmitted and reflected signal, said point spread function being said effect of the distance and atmosphere, and is determined for each of said patches.

6. The method as set forth in claim 5, wherein the point spread function is summed over a plurality of adjacent ones of said patches.

7. An apparatus for capturing an image from a distance comprising:

an image capture device and a transmission and reception device;

a control being capable of determining an effect of atmosphere and distance from the image capture device by utilizing a transmitted and reflected signal from the transmission and reception device, and analyzing the effect on the transmitted and reflected signal, and then being programmed to correct the captured image based upon the effect on the transmitted and reflected signal;

wherein the transmission and reception device breaks the area of the captured image into a plurality of patches, and said effect of the transmitted and reflected signal is analyzed separately for the plurality of patches, and utilized to correct the captured image; and wherein an area of interest is on the ground, and an angle between the image capture device and the ground, and a direction perpendicular from an aircraft mounting the image capture device and the ground is utilized to determine a number of said patches.

8. The apparatus as set forth in claim 7, wherein said transmission and reception device is a ladar.

9. The apparatus as set forth in claim 7, wherein said transmission and reception device and said image capture device are mounted on an aircraft.

10. The apparatus as set forth in claim 7, wherein a wavelength of the particular wavelength being analyzed is also utilized to determine the number of said patches.

11. The apparatus as set forth in claim 7, wherein a point spread function is determined as part of the effect of atmosphere and distance on the transmitted and reflected signal, and the point spread function is summed over a number of adjacent points, said point spread function being said effect of the distance and atmosphere, and is determined for each of said patches.

12. The apparatus as set forth in claim 11, wherein the point spread function is summed over a plurality of adjacent ones of said patches.

13. The method as set forth in claim 1, wherein the effect of the atmosphere on the transmitted and reflected signals includes the effect of turbulence.

14. The apparatus as set forth in claim 7, wherein the effect of the atmosphere on the transmitted and reflected signals includes the effect of turbulence.

15. The method as set forth in claim 5, wherein the point spread function is summed over a period of time.

16. The apparatus as set forth in claim 11, wherein the point spread function is summed over a period of time.

* * * * *